US008555153B2

(12) United States Patent
Song et al.

(10) Patent No.: US 8,555,153 B2
(45) Date of Patent: Oct. 8, 2013

(54) DETERMINING A FORM WITH WHICH PRINT DATA IS OUTPUTTED, ACCORDING TO CONDITIONS ON FIELDS OF THE PRINT DATA

(75) Inventors: Mi-sook Song, Suwon-si (KR); In-chang Park, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1098 days.

(21) Appl. No.: 11/952,257

(22) Filed: Dec. 7, 2007

(65) Prior Publication Data

US 2008/0137108 A1     Jun. 12, 2008

(30) Foreign Application Priority Data

Dec. 8, 2006 (KR) ........................ 10-2006-0124793

(51) Int. Cl.
*G06F 17/24* (2006.01)
(52) U.S. Cl.
USPC ........... 715/226; 358/1.1; 358/1.18; 715/200; 715/780
(58) Field of Classification Search
USPC .......... 358/1.1, 1.18, 1.15; 715/200, 226, 780
See application file for complete search history.

(56) References Cited

U.S. PATENT DOCUMENTS

| | | | |
|---|---|---|---|
| 5,971,632 A | 10/1999 | LaDue et al. | |
| 6,268,924 B1* | 7/2001 | Koppolu et al. | 358/1.13 |
| 6,671,060 B1* | 12/2003 | Fresk et al. | 358/1.15 |
| 6,741,992 B1* | 5/2004 | McFadden | 1/1 |
| 7,433,072 B2* | 10/2008 | Nishikawa | 358/1.18 |
| 2001/0011250 A1* | 8/2001 | Paltenghe et al. | 705/41 |
| 2004/0205467 A1 | 10/2004 | Kofman et al. | |
| 2005/0134933 A1* | 6/2005 | Tsue et al. | 358/437 |

FOREIGN PATENT DOCUMENTS

| | | |
|---|---|---|
| JP | 09-120406 | 5/1997 |
| KR | 2001-0077453 | 8/2001 |
| KR | 2004-0001162 | 1/2004 |

OTHER PUBLICATIONS

Korea Office Action dated Oct. 29, 2012 issued in Korean Application No. 2006-0124793.

* cited by examiner

*Primary Examiner* — Eric A Rust
(74) *Attorney, Agent, or Firm* — Stanzione & Kim, LLP

(57) ABSTRACT

An image processing apparatus includes: an image processing part that performs an image processing operation for print data having at least one field; and a controller that controls the image processing part to output the print data with a print form corresponding to a condition if the field of the print data satisfies the condition.

18 Claims, 6 Drawing Sheets

DETERMINING A FORM WITH WHICH PRINT DATA IS OUTPUTTED, ACCORDING TO CONDITIONS ON FIELDS OF THE PRINT DATA

CROSS-REFERENCE TO RELATED APPLICATIONS

This application claims priority from Korean Patent Application No. 10-2006-0124793, filed on Dec. 8, 2006 in the Korean Intellectual Property Office, the disclosure of which is incorporated herein by reference in its entirety.

BACKGROUND OF THE INVENTION

1. Field of the Invention

Apparatus and method consistent with the present general inventive concept relates to an image processing apparatus, and more particularly, to an image processing apparatus that outputs print data having a field.

2. Description of the Related Art

An image processing apparatus performs an image processing operation for converting print data prepared by a computer program to an image that is outputted to a medium. The print data outputted to the medium may include print data, such as a database, which has at least one field in which necessary values are stored. The print data having the field is outputted with a predetermined form.

If a user is to output the print data having the field, the user may select a desired output form downloaded externally with using a particular program and output the print data with the selected print form.

However, in the related art, if the print data having the field exists in the form of a file, the user has to specify the form for each file. In addition, if the user wants to specify various conditions depending on fields of the print data and outputs the print data with different forms based on the specified conditions, he/she has to specify the form for the each print data to be outputted.

SUMMARY OF THE INVENTION

The present general inventive concept provides an image processing apparatus and an image processing method using the same, which are capable of determining a form with which print data is outputted, according to conditions on fields of the print data, thereby providing a convenience to a user who wishes to output desired print data with a desired form.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing an image processing apparatus comprising: an image processing part that performs an image processing operation for print data having at least one field; and a controller that determines a condition on the field and a print form of the print data and controls the image processing part to output the print data of the field satisfying the determined condition with the determined print form.

The print data can comprise a record.

The image processing apparatus may further comprise a communicating part, wherein the controller controls the communicating part to receive information related to the condition and the print form from the outside and determines the condition and the print form based on the received information.

The image processing apparatus may further comprise a user input part, wherein the controller is inputted with at least one of the information related to the condition and the information related to the print form through the user input part.

The image processing apparatus may further comprise a display part, wherein the controller displays the condition and the print form on the display part.

The image processing apparatus may further comprise a user interface (UI) generating part, wherein the controller controls the UI generating part to generate a UI to provide input of the condition and the print form and display the generated UI on the display part.

The controller can control the display part to perform a preview function for the print data processed by the image processing part.

The image processing apparatus may also comprise a storing part, wherein the controller stores the condition and the print form in the storing part.

The controller can store the condition and the print form in the storing part in a form of Extensible Markup Language (XML).

If a plurality of conditions on the field of the print data is inputted by a user, the controller can determine the print form depending on one determined condition set according to a predetermined priority.

The controller can change the print form to match with the size of the print data.

The foregoing and/or other aspects and utilities of the present general inventive concept can also be achieved by providing a data providing server that provides data used to output a print data having at least one field, comprising; a server communication part that transmits/receives information related to a condition on the field and a print form of the print data; a server storing part that stores the information related to the condition and the print form; and a server controller that controls the server communication part to provide the information related to the print form determined depending on the information related to the condition received by the server communication part from the outside.

The server controller can confirm whether a user is authorized to store the information related to the condition and the print form and, if it is confirmed that the user is authorized to store the information, stores the information in the server storing part.

The server controller can store the condition and the print form in the server storing part in the form of Extensible Markup Language (XML).

If a plurality of conditions on the field of the print data is inputted by a user, the server controller can determine the print form depending on one determined condition set according to a predetermined priority.

The foregoing and/or other aspects and utilities of the present general inventive concept can also be achieved by providing an image processing apparatus including: an image processing part that performs an image processing operation for a print data having at least one field; and a controller that controls the image processing part to output the print data with a print form corresponding to a condition if the field of the print data satisfies the condition.

The print data may include a record.

The image processing apparatus may further include a communicating part, wherein the controller controls the communicating part to receive information related to the condition and the print form from an external source.

The image processing apparatus may further include a user input part, wherein the controller is inputted with at least one of the information related to the condition and the information related to the print form through the user input part.

The image processing apparatus may further including a storing part, wherein the controller stores the condition and the print form in the storing part.

If a plurality of conditions on the field of the print data is inputted by a user, the controller may control the image processing part to output print data with the print form corresponding to one determined condition set according to a predetermined priority.

The controller may change the print form to match with the size of the print data.

The foregoing and/or other aspects and utilities of the present general inventive concept can also be achieved by providing an image processing method of processing print data having at least one field, including: determining whether a field of the print data satisfies a condition; and outputting the print data with a print form corresponding to the condition if the field satisfies the condition.

The print data may include a record.

The outputting the print data may include receiving information related to the condition and the print form from an external source and outputting the print data based on the received information.

The determining whether the field of the print data satisfies the condition may include receiving at least one of the information related to the condition and the information related to the print form from a user.

The determining whether the field of the print data satisfies the condition may further include storing the condition and the print form corresponding to the condition.

The outputting the print data may include, if a plurality of conditions on the field of the print data is inputted by a user, outputting the print data with the print form corresponding to one determined condition set according to a predetermined priority.

The foregoing and/or other aspects and utilities of the present general inventive concept can also be achieved by providing a recording medium having recorded thereon a computer program to execute the aforementioned image processing method.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
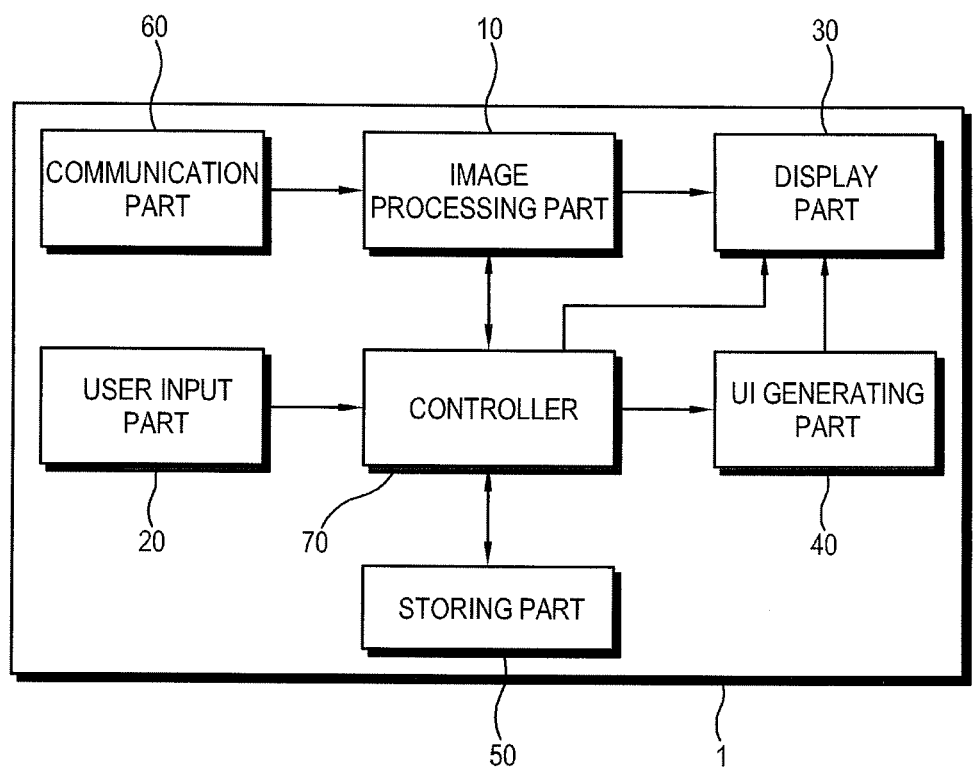
FIG. 1 is a block diagram illustrating a configuration of an image processing apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a configuration of an image processing apparatus according to an exemplary embodiment of the present general inventive concept. As illustrated in FIG. 1, an image processing apparatus 1 comprises an image processing part 10, a user input part 20, a display part 30, a user interface (UI) generating part 40, a storing part 50, a communication part 60, and a controller 70. In this embodiment, the image processing apparatus 1 may be embodied by a printer or another known image processing apparatus in the art.

The image processing part 10 performs an image processing operation for print data having at least one field. In this embodiment, the image processing part 10 comprises a photoconductor (not shown) on which an electrostatic latent image is formed, a developing unit (not shown) that develops the electrostatic latent image on the photoconductor with a developer, and a transfer roller (not shown) that transfers the developed electrostatic latent image into a print paper on which an image is printed.

The user input part 20 is inputted with information related to at least one condition on the field of the print data and a print form of the print data from a user. In this embodiment, the user input part 20 is provided at one side of a body of the image processing apparatus 1, but the user input part 20 may be provided in an external computer to be inputted with the information related to at least one condition on the field of the print data and the print form of the print data from the outside.

In addition, in this embodiment, the user input part 20 may be embodied by a wireless remote controller that may be provided with a menu key and a key signal generating part that generates a key signal when a key is pushed.

The display part 30 displays the condition on the field of the print data and the information on the print form of the print data under control of the controller 70 which will be described later. In this embodiment, the display part 30 may be embodied by a light emitting diode (LED), a liquid crystal display (LCD) panel or other displays known in the art.

In addition, the display part 30 may perform a preview function for the print data processed by the image processing part 10 under control of the controller 70. Then, a user can determine whether the print form of the print data printed according to the condition on the field of the print data is appropriate.

The UI generating part 40 generates a UI, which will be described later, to allow the user to input the information related to the condition on the field of the print data and the print form of the print data. A detail explanation about the UI according to embodiments of the present invention will be mentioned later.

The storing part 50 stores the information related to the condition regarding the field of the print data and the print form of the print data. In this embodiment, the information stored in the storing part 50 may include mapping information that maps the condition on the field of the print data to the print form of the print data, as will be described later. In this embodiment, the storing part 50 may be embodied by a non-volatile memory such as a flash memory, or a hard disk. Thus, if only the condition regarding the field of the print data is inputted, the controller 70 can determine the print form matching the inputted condition using the mapping information stored in the storing part 50.

The communication part 60 receives the information related to the condition regarding the field of the print data and the print form of the print data from an external source. Specifically, the controller 70 can determine the condition regarding the field of the print data and the print form of the print data based on the information received from an external source via the communication part 60 in addition to the information stored in the storing part 50 and the information inputted from the user input part 20.

In this embodiment, the communication part 60 may be provided as not only a wired network but also a network to interconnect a plurality of electronic devices, such as a wireless local area network (LAN) module or a Bluetooth.

The controller 70 controls the image processing part 10 to output the print data with the print form corresponding to the condition if the field of the print data satisfies the condition. In this embodiment, the controller 70 may be embodied by a software program or others known in the art.

Hereinafter, an operation of the controller 70 will be described in conjunction with user interfaces shown in FIGS. 2A to 2C.

Figure 2A:
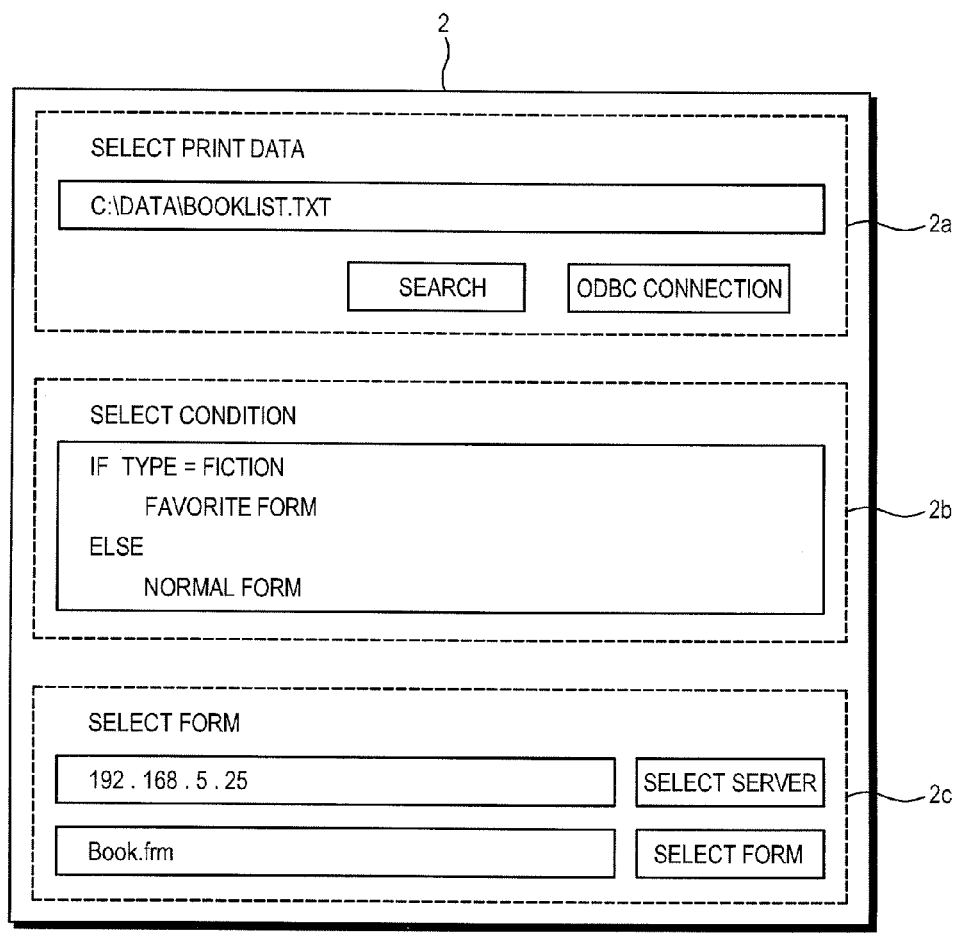
FIGS. 2A, 2B and 2C are views illustrating user interfaces of the image processing apparatus according to the exemplary embodiment of the present general inventive concept.

FIG. 2A illustrates a user interface 2 to allow a user to select the condition regarding the field of the print data and the print form of the print data. As illustrated in FIG. 2A, the user interface 2 comprises an interface 2a to select the print data, an interface 2b to select the condition regarding the field of the print data, and an interface 2c to select the print form of the print data.

If the user inputs an instruction to output the print data, the controller 70 controls the UI generating part 40 to generate the user interface 2 to select the condition regarding the field of the print data and the print form of the print data and controls the display part 30 to display the generated interface 2.

When the user interface 2 is displayed on the display part 30, the user selects the print data, the condition on the field of the print data, and the print form of the print data, which are inputted to the controller 70.

The user interface 2a to select the print data may comprise a button to select the print data in the form of a file and a button to provide open database connectivity (ODBC) for access to a database.

The user interface 2b to select the condition regarding the field of the print data may allow the user to edit a query at first hand, or alternatively, may allow the user to select the condition regarding the field of the print data without difficulty by reading the field of the print data from a database and displaying the read field on the user interface 2b.

The user interface 2c to select the print form of the print data may allow the user to select the print form of the print data stored externally by inputting an IP address, or alternatively, may allow the user to select the print form of the print data stored in the storing part 50 of the image processing apparatus 1.

Figure 2B:
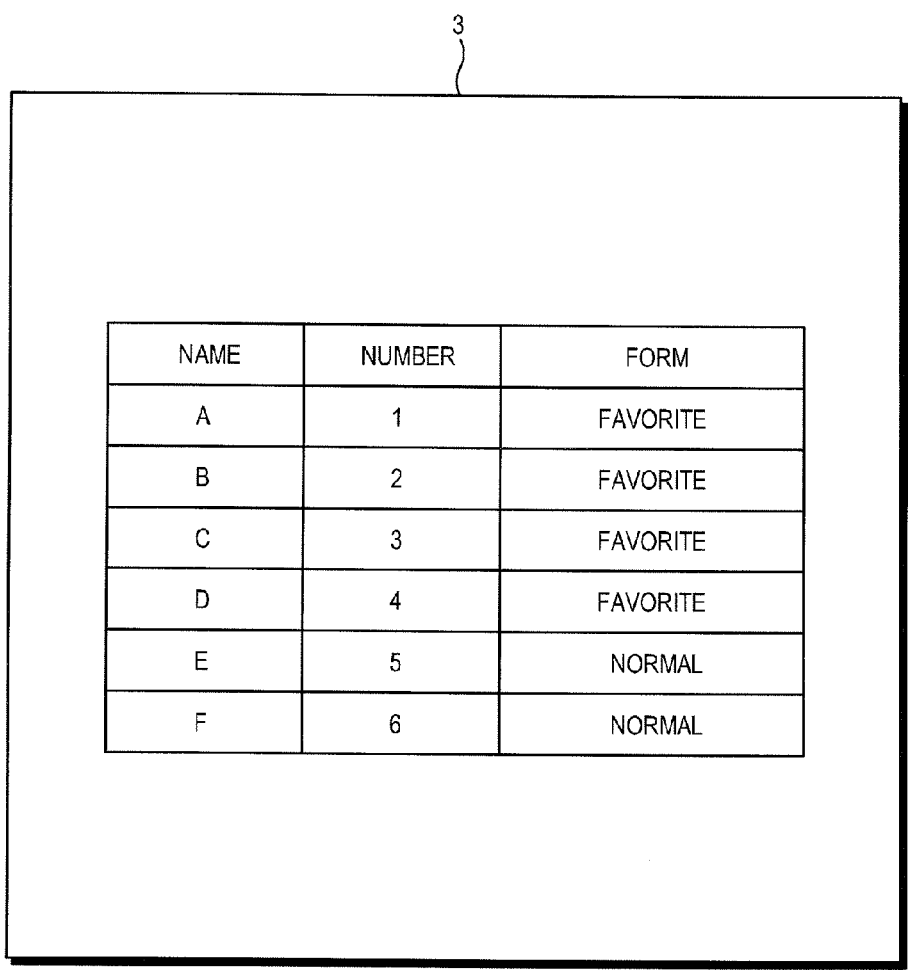

FIG. 2B illustrates a user interface 3 to indicate the field of the print data and the print form of the print data determined according to the condition on the field. When the condition on the field of the print data and the print form of the print data are determined by the user, the controller 70 controls the UI generating part 40 to generate the user interface 3 to indicate the field of the print data and the print form of the print data determined according to the condition regarding the field.

In this embodiment, if the print data exists in the form of a record, the user interface 3 displays a content of the field of each record and the print form of the print data determined according to the condition regarding the field of the record. Of course, the user may re-specify the condition and the print form before the user outputs the print data, based on the displayed content of the field of the record and the indicated print form.

Figure 2C:
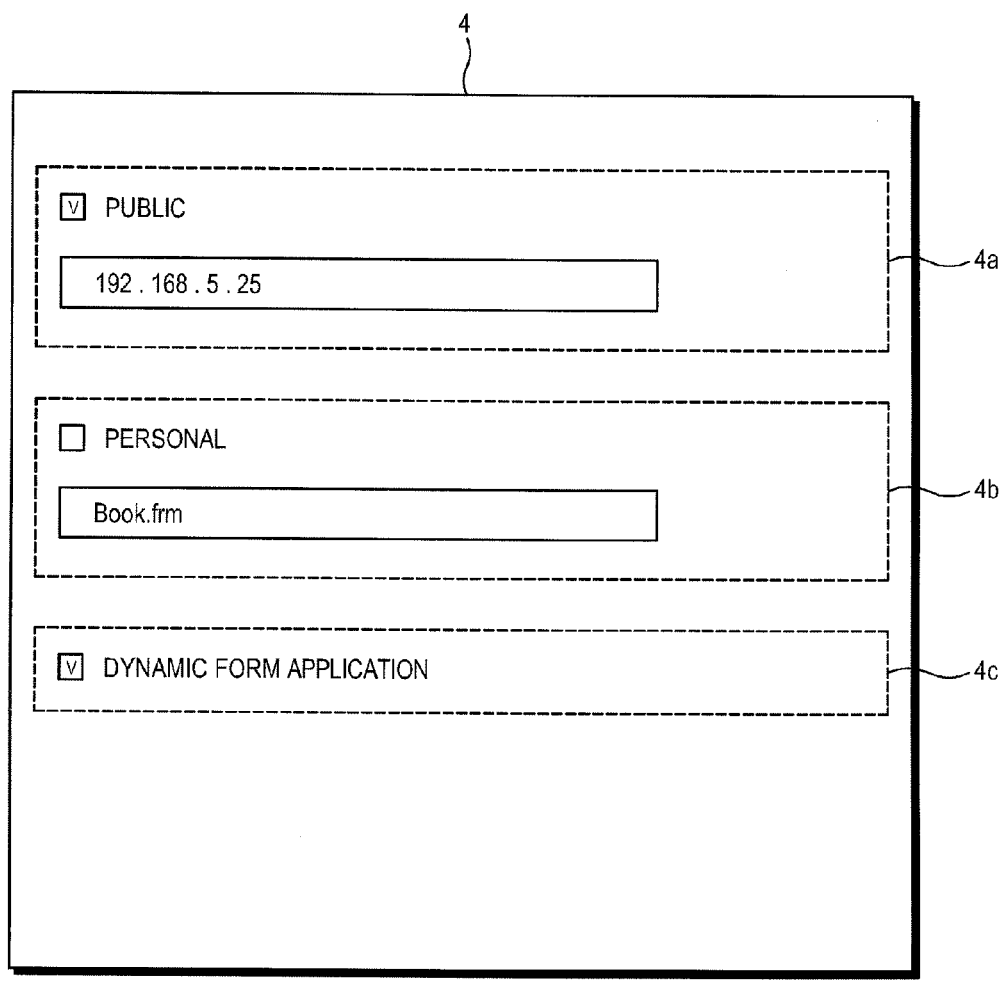

FIG. 2C illustrates a user interface 4 to allow the user to store the mapping information that maps the condition regarding the field selected by the user to the print form of the print data according to the selected condition.

As illustrated in FIG. 2C, the user interface 4 comprises a user interface 4a to allow the user to store the mapping information in an external server or the like and a user interface 4b to allow the user to store the mapping information in a terminal such as the storing part 50 or a personal computer.

Here, if the user wishes to store the mapping information in the external server, it is preferable but not necessary that he/she may confirm whether he/she is authorized to store the mapping information by inputting an ID and a password.

Thus, the stored information may be read, and can be used to print various types of print data with desired print forms by a one-time operation for a future request from a user based on the read mapping information. In addition, even when the print form of the print data is updated, the user does not have to re-select the updated print form since the user can use the mapping information.

In addition, the user interface 4 may further comprise a user interface 4c for option to dynamically change the print form of the print data. In general, a form of items in which the contents of the fields are displayed is constant independent of the size of the print data. Accordingly, if the fields have a great quantity of contents, the print form of the print data is configured so that the contents of the fields can be displayed using a scroll bar or the like.

In this embodiment, the controller 70 can access a resource file of the print form of the print data stored in the storing part 50 to change the size of the items in which the contents of fields are displayed so that the print form of the print data can be varied depending on the size of the print data.

On the other hand, it is preferable but not necessary that the controller 70 stores the mapping information that maps the condition on the field of the print data to the print form of the print data, in the form of Extensible Markup Language (XML). Thus, since the XML facilitates a process of structural data, unlike Hyper text Markup Language HTML, the print data can be efficiently processed if the print data is embodied by a database or the like.

In addition, if a plurality of conditions on the field of the print data is inputted by the user, the controller 70 can determine the print form of the print data depending on one determined condition set according to a predetermined priority. In this embodiment, it is preferable but not necessary that the predetermined priority is stored beforehand in the storing part 50 by the field of the print data.

Hereinafter, the data providing server according to an exemplary embodiment will be described with reference to FIG. 3.

Figure 3:
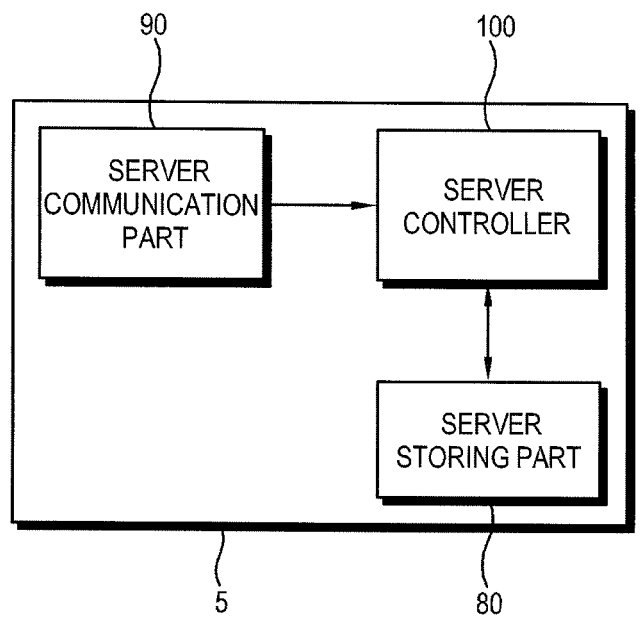
FIG. 3 is a view illustrating a configuration of a data providing server according to an exemplary embodiment of the present general inventive concept.

As illustrated in FIG. 3, the data providing server 5 according to this exemplary embodiment comprises a server storing part 80, a server communication part 90 and a server controller 100.

The server storing part 80 stores the information related to the condition regarding the field of the print data and the print form of the print data. In this embodiment, the information may comprise the mapping information that maps the condition regarding the field of the print data to the print form of the print data. It is preferable but not necessary that the mapping information is stored in the server storing part 80 in the form of a table.

In this embodiment, the server storing part 80 may be embodied by a nonvolatile memory such as a flash memory, or a hard disk, like the storing part 50 of the image processing apparatus 1.

The server communication part 90 transmits/receives information related to the condition regarding the field of the print data and the print form of the print data. In this embodiment, the server communication part 90 may be provided as not only a wired network but also a network to interconnect a plurality of electronic devices, such as a wireless local area network (LAN) module or a Bluetooth, like the communication part 60 of the image processing apparatus 1.

When the server communication part 90 receives the condition regarding the field of the print data from an external source, the server controller 100 controls the server communication part 90 to provide the information related to the print form determined depending on the received conditions. In this embodiment, the server controller 100 may be embodied by a software program.

At a request for the information related to the print form of the print data from the image processing apparatus 1 or a user terminal or the like, the server controller 100 controls the server communication part 90 to transmit the information related to the print form by referring to the mapping information stored in the server storing part 80.

Thus, even if the image processing apparatus 1 does not have the information related to the print form of the print data, the image processing apparatus 1 can receive the information related to the print form of the print data from the data providing server 5 and print various types of print data with desired print forms without difficulty based on the received information.

In this embodiment, since the data providing server 5 can be used by a plurality of users, it is preferable but not necessary that the server controller 100 confirms whether the users are authorized to store the information related to the condition on the field of the print data and the print form of the print data in the server storing part 80.

In addition, if a plurality of conditions regarding the field of the print data is inputted from an external source, the server controller 100 can determine and provide the print form of the print data depending on one determined condition set according to a predetermined priority.

Figure 4:
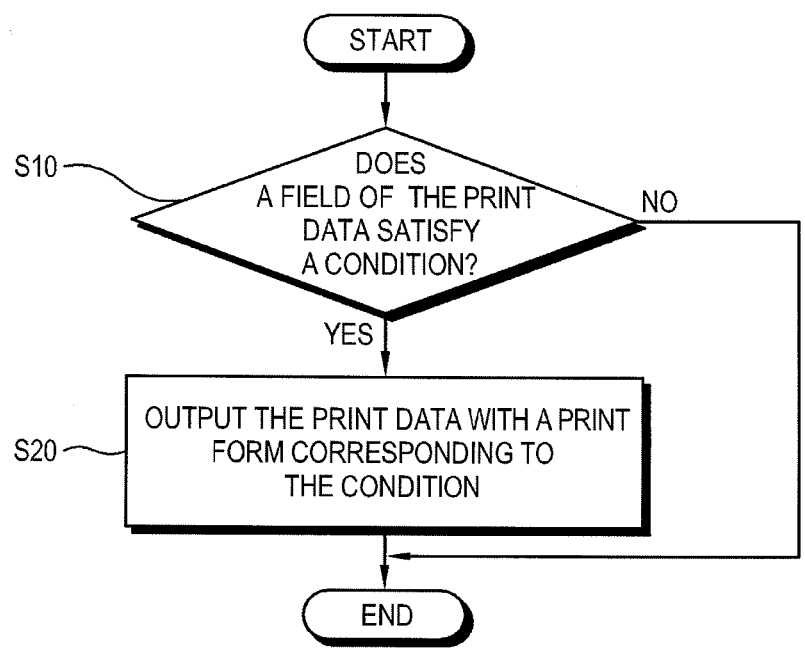
FIG. 4 is a flow chart illustrating an image processing method using the image processing apparatus and the data providing server according to the exemplary embodiment of the present general inventive concept.

Hereinafter, an image processing method according to an exemplary embodiment will be described with reference to FIG. 4.

First, the controller 70 determines whether the field of the print data satisfies the condition at operation S10. Here, the controller 70 can be inputted with the information related to the condition regarding the field of the print data and the print form of the print data from a user or an external terminal or the like. Here, if a plurality of conditions regarding the field of the print data is inputted from an external source, it is preferable but not necessary that the controller 70 determines the print form of the print data depending on one determined condition set according to a predetermined priority.

In addition, the image processing method may further comprise an operation of displaying and storing the conditions and the print form determined in the operation S10.

Next, the controller 70 outputs the print data with the print form corresponding to the condition if the field of the print data satisfies the condition at operation S20.

Here, the image processing method may further comprise an operation of performing a preview function for the print data outputted in the operation S20, and the controller 70 can change the size of items in which the contents of fields of the print data are displayed so that the print form of the print data can be varied depending on the size of the print data.

As apparent from the above description, embodiments herein provide an image processing apparatus, a data providing server, and an image processing method using the same, which are capable of outputting print data desired by a user with a print form desired by the user by determining the print form of the print data according to a condition regarding the field of the print data and outputting the print data with the determined print form.

In addition, by using mapping information that maps the condition on the field of the print data to the print form of the print data, when the print data are printed, the print form of the print data need not be specified, and, even when the print form of the print data is updated, the updated print form need not be re-selected.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An image processing apparatus comprising:
an image processing part that performs an image processing operation for a print data having at least one field; and
a controller that selects, based on a condition corresponding to a field of the print data, a print form to print the print data from a plurality of pre-stored print forms, the condition including a plurality of conditions corresponding to the field of the print data, and controls the image processing part to output the print data with the selected print form corresponding to the condition if the field of the print data satisfies the condition, the controller to control the image processing part to print the print data with the print form corresponding to one determined condition from among the plurality of conditions set according to a predetermined priority,
wherein the controller is arranged to change the size of items in which contents of the fields of the print data are displayed so that the print form of the print data is varied depending on the size of the print data such that the size of the print form is constant independent of the size of the print data.

2. The image processing apparatus according to claim 1, wherein the print data comprises a record.

3. The image processing apparatus according to claim 1, further comprising a communicating part,
wherein the controller controls the communicating part to receive information related to the condition and the print form from an external source.

4. The image processing apparatus according to claim 1, further comprising a user input part,
wherein the controller is inputted with at least one of the information related to the condition and the information related to the print form through the user input part.

5. The image processing apparatus according to claim 1, further comprising a storing part,
wherein the controller stores the condition and the print form in the storing part.

6. The image processing apparatus according to claim 1, wherein the controller changes the print form to match with the size of the print data.

7. An image processing method of processing print data, the method comprising:
- determining whether a field of the print data satisfies a condition corresponding to the field of the print data;
- selecting, based on the condition, a print form to print the print data from a plurality of pre-stored print forms, the condition including a plurality of conditions corresponding to the field of the print data;
- printing the print data with the selected print form corresponding to the condition if the field satisfies the condition, the printing the print data comprising printing the print data with the print form corresponding to one determined condition from among the plurality of conditions set according to a predetermined priority; and
- changing the size of items in which contents of the field of the print data are displayed so that the print form of the print data is varied depending on the size of the print data such that the size of the print form is constant independent of the size of the print data.

8. The image processing method according to claim 7, wherein the print data comprises a record.

9. The image processing method according to claim 7, wherein the printing the print data comprises receiving information related to the condition and the print form from an external source and printing the print data based on the received information.

10. The image processing method according to claim 7, wherein the determining whether the field of the print data satisfies the condition comprises receiving at least one of the information related to the condition and the information related to the print form from a user.

11. The image processing method according to claim 7, wherein the determining whether the field of the print data satisfies the condition further comprises storing the condition and the print form corresponding to the condition.

12. A non-transitory recording medium recorded with a computer program for executing an image processing method according to claim 7.

13. An image processing apparatus comprising:
- an image processing part to perform an image processing operation for a print data having at least one field; and
- a controller to select a print form matching a condition on the field of the print data to print the print data, the print form being selected from a plurality of pre-stored print forms using mapping information that maps the condition to the print form of the print data, and to control the image processing part to print the print data with the selected print form matching the condition,
- wherein the controller is arranged to change the size of items in which contents of the fields of the print data are displayed so that the print form of the print data is varied depending on the size of the print data such that the size of the print form is constant independent of the size of the print data.

14. The image processing apparatus according to claim 13, wherein the controller stores the mapping information in Extensible Markup Language (XML).

15. The image processing apparatus according to claim 13, further comprising:
- a display part to perform a preview function for the print data printed with the print form matching the condition.

16. The image processing apparatus according to claim 13, further comprising:
- a user interface generating part to generate a user interface to select the condition on the field of the print data and the print form of the print data.

17. The image processing apparatus according to claim 13, wherein, if there is a plurality of conditions on the field of the print data, the controller determines the print form of the print data depending on one determined condition set according to a predetermined priority.

18. The image processing apparatus according to claim 13, further comprising:
- a user interface generating part to generate a user interface listing the print data, the field of the print data, and the print form matching the condition.

* * * * *